US010818211B2

(12) United States Patent
Yu et al.

(10) Patent No.: US 10,818,211 B2
(45) Date of Patent: Oct. 27, 2020

(54) DISPLAY APPARATUS AND INTER-CHIP BUS THEREOF

(71) Applicant: Raydium Semiconductor Corporation, Hsinchu (TW)

(72) Inventors: Shang-Han Yu, Changhua (TW); Sung-Bo Chen, Zhubei (TW); Chih-Chuan Huang, Zhubei (TW)

(73) Assignee: Raydium Semiconductor Corporation, Hsinchu County (TW)

(*) Notice: Subject to any disclaimer, the term of this patent is extended or adjusted under 35 U.S.C. 154(b) by 0 days.

(21) Appl. No.: 16/394,200

(22) Filed: Apr. 25, 2019

(65) Prior Publication Data

US 2020/0005697 A1 Jan. 2, 2020

(30) Foreign Application Priority Data

Jun. 29, 2018 (TW) ............................ 107122677 A

(51) Int. Cl.
*G06F 3/038* (2013.01)
*G09G 5/00* (2006.01)
*G09G 3/20* (2006.01)

(52) U.S. Cl.
CPC .............. *G09G 3/20* (2013.01); *G09G 5/006* (2013.01); *G09G 2310/0264* (2013.01); *G09G 2310/08* (2013.01); *G09G 2320/0252* (2013.01)

(58) Field of Classification Search
CPC ... G09G 2310/0221; G09G 2310/0264; G09G 2310/08; G09G 2320/0252; G09G 2370/08; G09G 3/20; G09G 3/3648; G09G 5/006
See application file for complete search history.

(56) References Cited

U.S. PATENT DOCUMENTS

2016/0155421 A1* 6/2016 Han ...................... G09G 5/006 345/213
2018/0182278 A1* 6/2018 Kim .................... G09G 3/3275

* cited by examiner

*Primary Examiner* — Insa Sadio

(57) ABSTRACT

A display apparatus is disclosed. The display apparatus includes a display panel, a master timing controller embedded driver (TED), N slave TEDs and an inter-chip bus. N is a positive integer. The display panel has (N+1) display areas. The master TED is disposed corresponding to a first display area. The N slave TEDs are disposed corresponding to a second display area~a (N+1)-th display area respectively and controlled by the master TED. The inter-chip bus includes a first wire and a second wire coupled between the master TED and N slave TEDs respectively and used for bi-directionally transmitting clock signal and data signal respectively.

22 Claims, 5 Drawing Sheets

DISPLAY APPARATUS AND INTER-CHIP BUS THEREOF

BACKGROUND OF THE INVENTION

1. Field of the Invention

The invention relates to a display apparatus; in particular, to a display apparatus and an inter-chip bus thereof.

2. Description of the Prior Art

In general, an inter-chip interface is required between a master timing controller embedded driver (TED) and a slave timing controller embedded driver to achieve display synchronization between the timing controller embedded drivers.

For example, as shown in FIG. 1, a serial peripheral interface bus SPI is disposed between the master timing controller embedded driver MTED and the slave timing controller embedded driver STED to exchange video data between the master timing controller embedded driver MTED and the slave timing controller embedded driver STED.

In addition, as shown in FIG. 1, a first wire L1 to a fifth wire L5 are also disposed between the master timing controller embedded driver MTED and the slave timing controller embedded driver STED to transmit a vertical synchronization signal VS, a horizontal synchronization signal HS, an output polarity signal PS, a horizontal line processing signal HL and a fault flag signal FS. The vertical synchronization signal VS, the horizontal synchronization signal HS and the output polarity signal PS are transmitted from the master timing controller embedded driver MTED to the slave timing controller embedded driver STED.

As shown in FIG. 2, an embodiment of the vertical synchronization signal VS and the horizontal synchronization signal HS is illustrated. As shown in FIG. 2, at the time T1, the rising edge of the vertical synchronization signal VS is aligned with one falling edge of the horizontal synchronization signals HS; at time T2, the falling edge of the vertical synchronization signal VS is aligned with another falling edge of the horizontal synchronization signal HS.

However, since the inter-chip interface between the master timing controller embedded driver MTED and the slave timing controller embedded driver STED needs five wires (the first wire L1 to the fifth wire L5), the circuit structure of the inter-chip interface will become relatively complicated, which not only requires a large wafer area, but also increases the production cost.

SUMMARY OF THE INVENTION

Therefore, the invention provides a display apparatus and an inter-chip bus thereof to solve the above-mentioned problems of the prior arts.

A preferred embodiment of the invention is a display apparatus. In this embodiment, the display apparatus includes a display panel, a master timing controller embedded driver (TED), N slave TEDs and an inter-chip bus. N is a positive integer. The display panel has (N+1) display areas. The master TED is disposed corresponding to a first display area. The N slave TEDs are disposed corresponding to a second display area to a (N+1)-th display area respectively and controlled by the master TED. The inter-chip bus includes a first wire and a second wire. The first wire is coupled between the master timing controller embedded driver and the N slave timing controller embedded drivers and used for bi-directionally transmitting a clock signal. The second wire is coupled between the master timing controller embedded driver and the N slave timing controller embedded drivers and used for bi-directionally transmitting a data signal.

In an embodiment, the display apparatus further includes a gate driver, the gate driver is coupled to a specific slave timing controller embedded driver of the N slave timing controller embedded drivers and controlled by the specific slave timing controller embedded driver.

In an embodiment, among the N slave timing controller embedded drivers, the specific slave timing controller embedded driver is closest to the gate driver.

In an embodiment, when the data signal is changed from low-level to high-level and corresponds to the clock signal at high-level, a vertical synchronization signal is determined according to the clock signal and the data signal.

In an embodiment, the vertical synchronization signal is also a reset signal of the inter-chip bus.

In an embodiment, when the data signal is changed from high-level to low-level and corresponds to the clock signal at high-level, a horizontal synchronization signal is determined according to the clock signal and the data signal.

In an embodiment, the horizontal synchronization signal is also a reset signal of the inter-chip bus.

In an embodiment, when a time that the data signal is changed from low-level to high-level is earlier than a time that the clock signal is changed from low-level to high-level and a time that the data signal is changed from high-level to low-level is later than a time that the clock signal is changed from high-level to low-level, a valid data transaction or a control command is determined according to the clock signal and the data signal.

In an embodiment, when the control command is a broadcast enable signal, the master timing controller embedded driver in a startup state can propose a request of writing to the N slave timing controller embedded drivers.

In an embodiment, when the control command is a broadcast disable signal, the master timing controller embedded driver in a startup state can propose a request of writing or reading to a specific slave timing controller embedded driver of the N slave timing controller embedded drivers.

In an embodiment, when the specific slave timing controller embedded driver is in the startup state in response to the request for writing or reading of the master timing controller embedded driver, the specific slave timing controller embedded driver returns a reply data.

In an embodiment, the display apparatus further includes a circuit board, the first wire and the second wire are disposed on the circuit board and coupled to the master timing controller embedded driver and the N slave timing controller embedded drivers respectively.

Another preferred embodiment of the invention is an inter-chip bus. In this embodiment, the inter-chip bus is applied to a display apparatus including a display panel, a master timing controller embedded driver and N slave timing controller embedded drivers. The display panel has (N+1) display areas, wherein N is a positive integer. The master timing controller embedded driver is disposed corresponding to a first display area of the (N+1) display areas. The N slave timing controller embedded drivers is disposed corresponding to a second display area to a (N+1)-th display area of the (N+1) display areas respectively and controlled by the master timing controller embedded driver. The inter-chip bus includes a first wire and a second wire. The first wire is coupled between the master timing controller embedded driver and the N slave timing controller embedded drivers and used for bi-directionally transmitting a clock signal. The second wire is coupled between the master timing controller embedded driver and the N slave timing controller embedded drivers and used for bi-directionally transmitting a data signal.

Compared to the prior art, in the display apparatus of the invention, the inter-chip interface between the master timing controller embedded driver and the slave timing controller embedded drivers only needs an inter-chip bus including two wires to achieve the display synchronization between the master timing controller embedded driver and the slave timing controller embedded drivers. Since the circuit structure of the inter-chip interface becomes simpler, not only the occupied wafer area can be greatly reduced, but also the production cost can be effectively reduced to enhance its market competitiveness.

The advantage and spirit of the invention may be understood by the following detailed descriptions together with the appended drawings.

BRIEF DESCRIPTION OF THE APPENDED DRAWINGS

Figure 7:
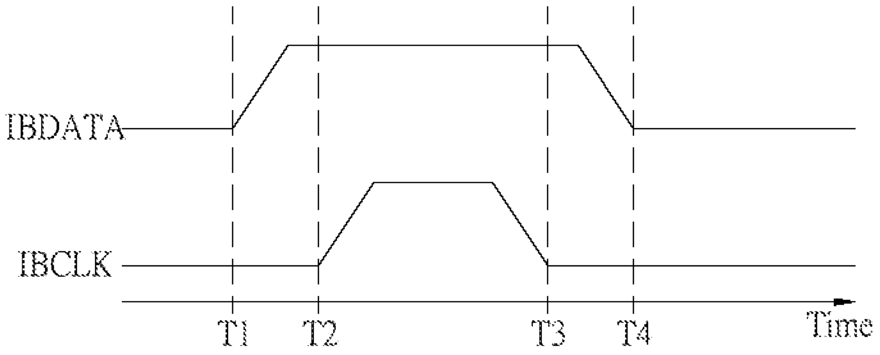

FIG. 7 illustrates a schematic diagram showing when a time that the data signal is changed from low-level to high-level is earlier than a time that the clock signal is changed from low-level to high-level and a time that the data signal is changed from high-level to low-level is later than a time that the clock signal is changed from high-level to low-level, a valid data transaction or a control command is determined according to the clock signal and the data signal.

Figure 8:
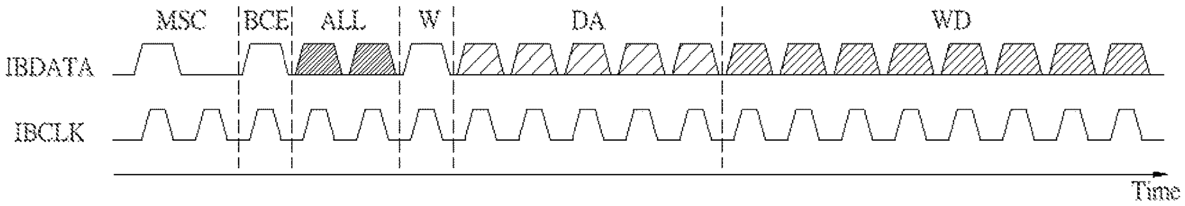

FIG. 8 illustrates a timing diagram showing the master timing controller embedded driver proposes a request for writing to all slave timing controller embedded drivers.

Figure 9:
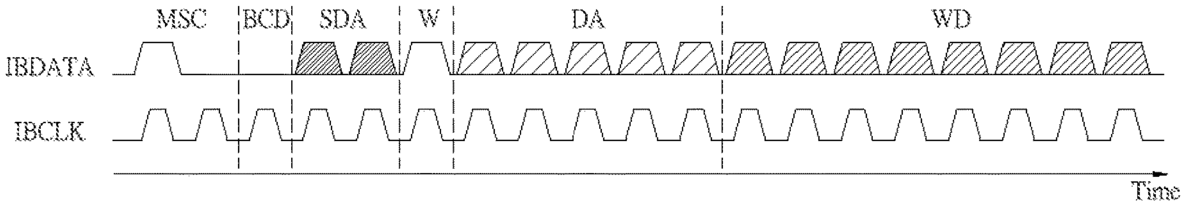

FIG. 9 illustrates a timing diagram showing the master timing controller embedded driver proposes a request for writing to a specific slave timing controller embedded driver.

Figure 10:
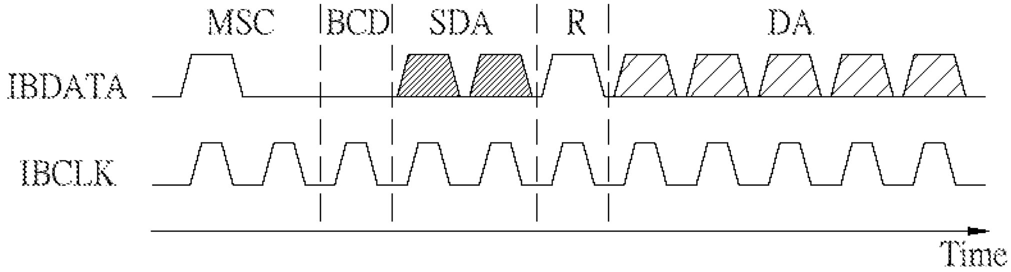

FIG. 10 illustrates a timing diagram showing the master timing controller embedded driver proposes a request for reading to a specific slave timing controller embedded driver.

Figure 11:
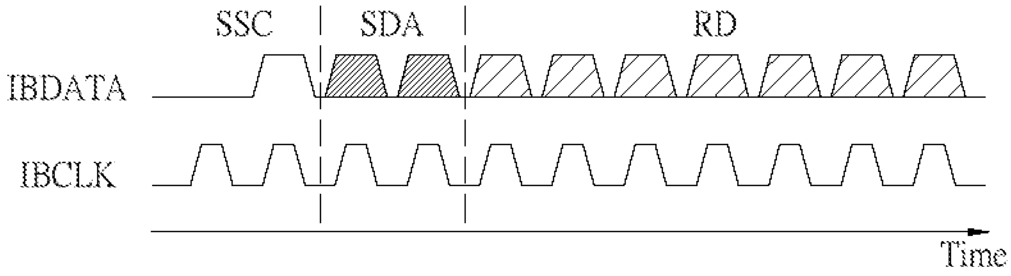

FIG. 11 illustrates a timing diagram showing the specific slave timing controller embedded driver returns a reply data in response to the request for writing or reading of the master timing controller embedded driver.

DETAILED DESCRIPTION OF THE INVENTION

A preferred embodiment of the invention is a display apparatus. In this embodiment, the display apparatus can be a thin-film transistor liquid crystal display (TFT-LCD), a flexible display or a curved display, but not limited to this.

Figure 1:
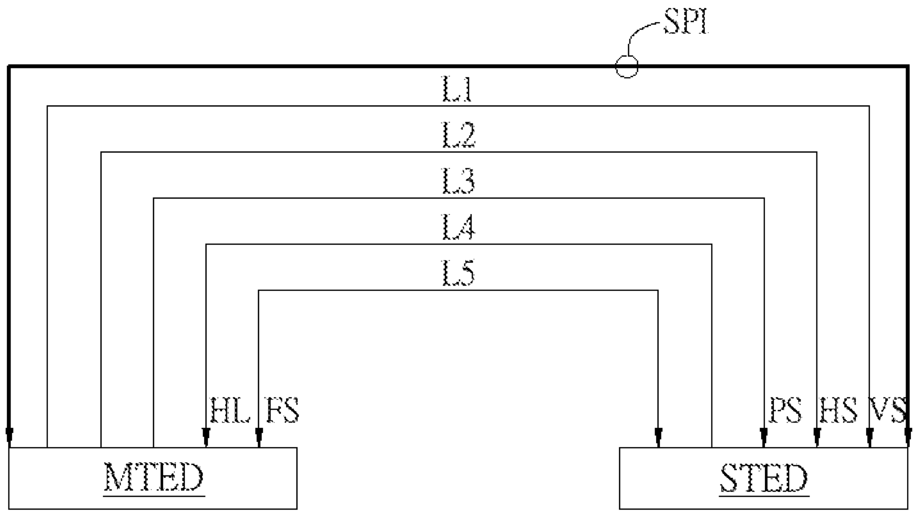
FIG. 1 (PRIOR ART)
FIG. 1 illustrates a schematic diagram showing the serial peripheral interface bus disposed between the master timing controller embedded driver and the slave timing controller embedded driver includes five wires in the prior art.
Figure 2:
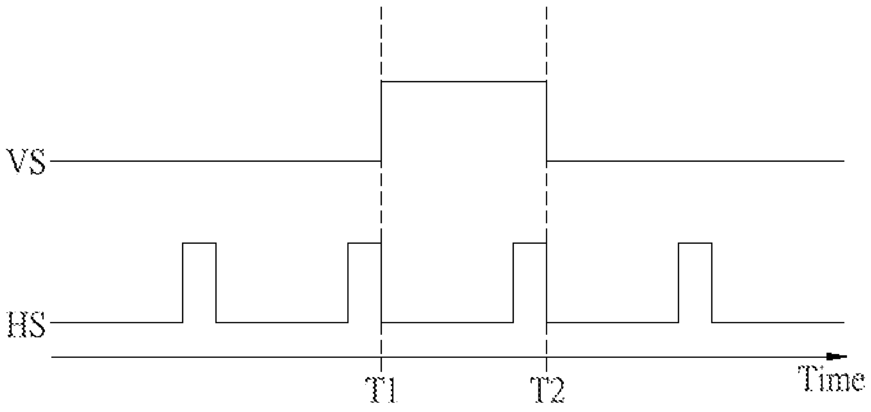
FIG. 2 (PRIOR ART)
FIG. 2 illustrates an embodiment of the vertical synchronization signal and the horizontal synchronization signal in FIG. 1.
Figure 3:
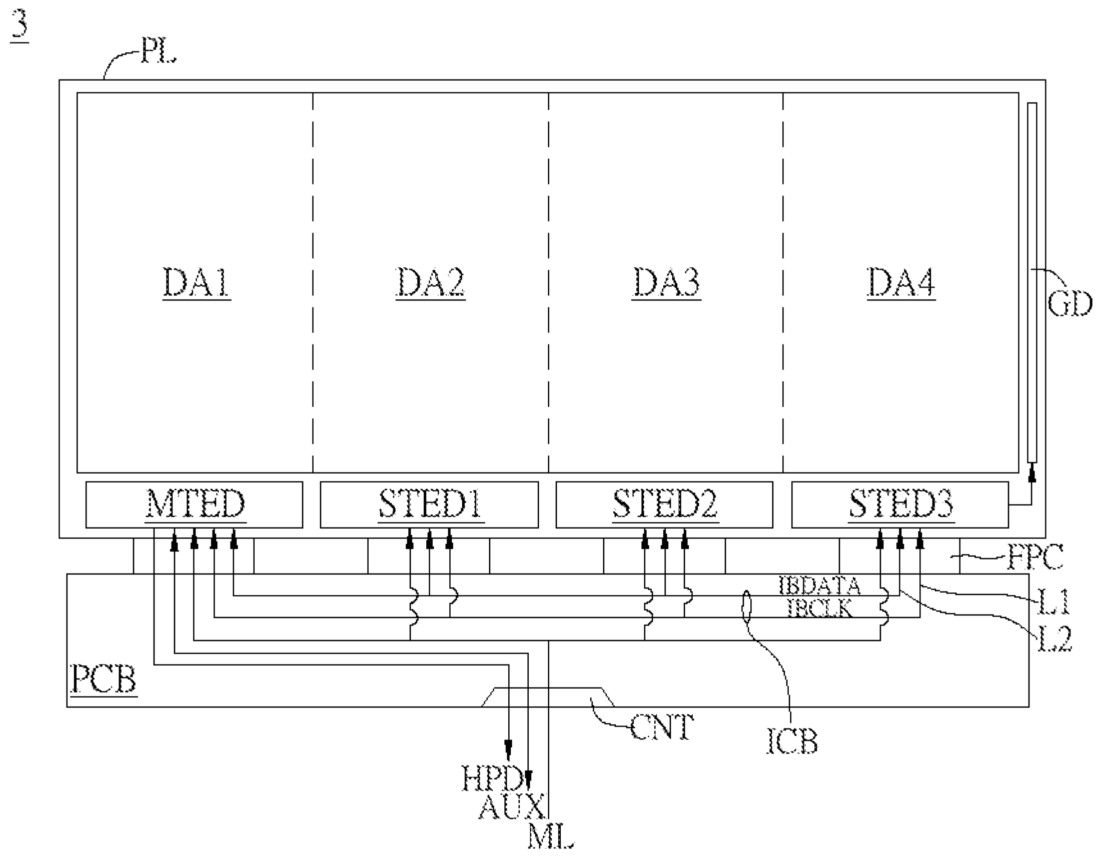
FIG. 3 illustrates a schematic diagram of a display apparatus in accordance with an embodiment of the invention.

Please refer to FIG. 3. FIG. 3 illustrates a schematic diagram of a display apparatus in this embodiment. As shown in FIG. 3, the display apparatus 3 includes a display panel PL, a master timing controller embedded driver MTED, N slave timing controller embedded drivers STED1 to STED3, an inter-chip bus ICB and a gate driver GD. N is a positive integer. In this embodiment, N=3, but not limited to this.

The display panel has (N+1) display areas DA1 to DA4. The master timing controller embedded driver MTED is disposed corresponding to the first display area DA1. The N slave timing controller embedded drivers STED1 to STED3 are disposed corresponding to the second display area DA2 to the (N+1)th display area DA4 respectively and controlled by the master timing controller embedded driver MTED.

The inter-chip bus ICB includes a first wire L1 and a second wire L2. The first wire L1 is coupled between the master timing controller embedded driver MTED and the N slave timing controller embedded drivers STED1~STED3 for bidirectionally transmitting a clock signal IBCLK; the second wire L2 is coupled between the master timing controller embedded driver MTED and the N slave timing controller embedded drivers STED1~STED3 for bidirectional transmitting a data signal IBDATA.

The gate driver GD is coupled to a specific slave timing controller embedded driver of the N slave timing controller embedded drivers STED1 to STED3 and controlled by the specific slave timing controller embedded driver. In this embodiment, the specific slave timing controller embedded driver can be the slave timing controller embedded driver STED3 which is closest to the gate driver GD among the N slave timing controller embedded drivers STED1 to STED3, but not limited to this.

In practical applications, the display apparatus 3 further includes a circuit board PCB. The circuit board PCB can be coupled to the display panel PL through the flexible board FPC. The first wire L1 and the second wire L2 can be disposed on the circuit board PCB and coupled to the master timing controller embedded driver MTED and the N slave timing controller embedded drivers STED1 to STED3 respectively.

In addition, a connector CNT can be disposed on the circuit board PCB for connecting wires transmitting other signals (such as the hot plug detection signal HPD, the sound source signal AUX and the main channel signal ML, etc.) to the outside.

Figure 4:
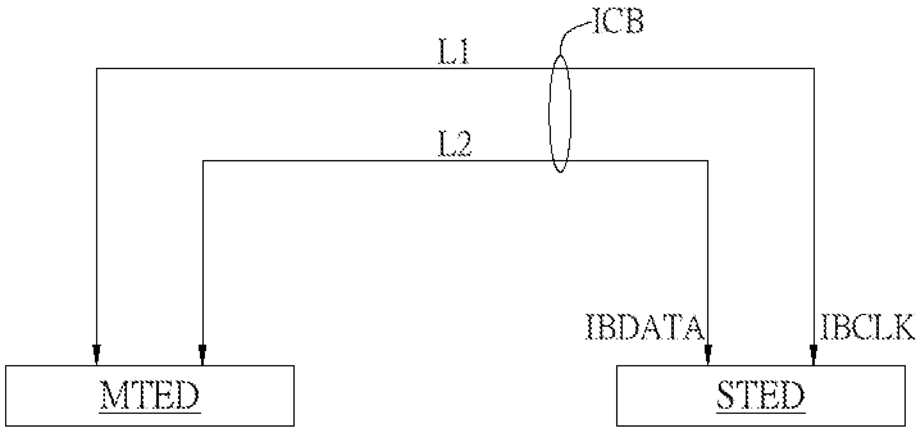
FIG. 4 illustrates a schematic diagram showing the inter-chip bus disposed between the master timing controller embedded driver and the slave timing controller embedded drivers only needs to include two wires.

In another embodiment, if N=1, as shown in FIG. 4, the inter-chip bus ICB disposed between the master timing controller embedded driver MTED and the slave timing controller embedded drivers STED includes the first wire L1 and the second wire L2. The first wire L1 is coupled between the master timing controller embedded driver MTED and the slave timing controller embedded drivers STED for bidirectionally transmitting the clock signal IBCLK; the second wire L2 is coupled to the master timing controller embedded driver MTED and the slave timing controller embedded drivers STED for bidirectionally transmitting the data signal IBDATA.

Next, it will be explained in detail how to represent the horizontal synchronization signal, the vertical synchronization signal, the valid data transaction or control command through the clock signal IBCLK transmitted by the first wire L1 and the data signal IBDATA transmitted by the second wire L2.

Figure 5:
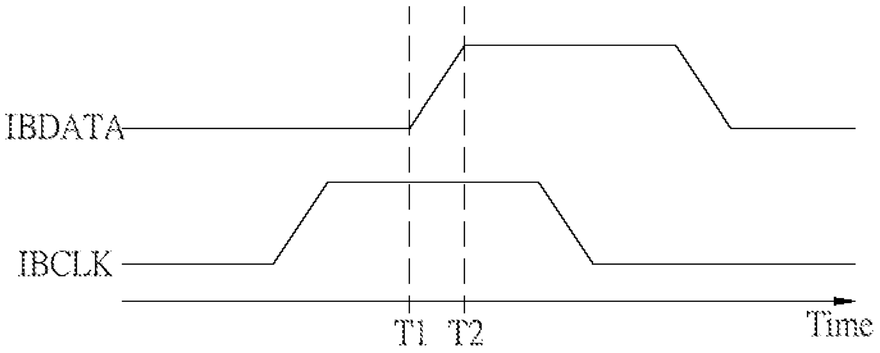
FIG. 5 illustrates a schematic diagram showing when the data signal is changed from low-level to high-level and corresponds to the clock signal at high-level, the vertical synchronization signal is determined according to the clock signal and the data signal.

Please refer to FIG. 5. If the data signal IBDATA transmitted by the second wire L2 is changed from low-level to high-level in the time T1 to T2 and corresponds to the clock signal IBCLK at high-level transmitted by the first wire L1, it represents that the vertical synchronization signal VS can be determined according to the corresponding relationship between the clock signal IBCLK and the data signal IBDATA. In practical applications, the vertical synchronization signal VS can also be a reset signal of the inter-chip bus ICB, but not limited to this.

Figure 6:
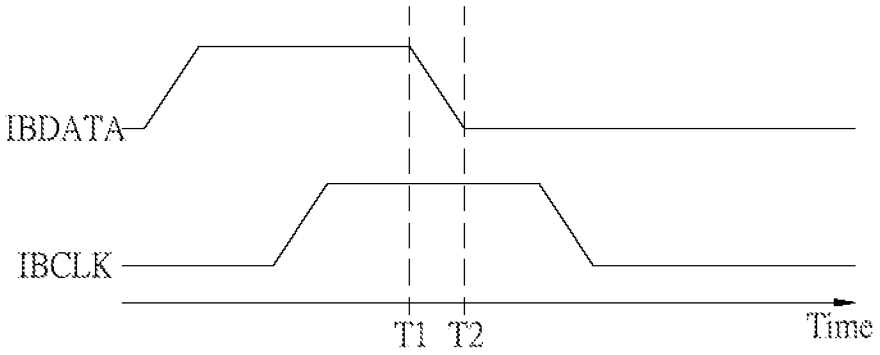
FIG. 6 illustrates a schematic diagram showing when the data signal is changed from high-level to low-level and corresponds to the clock signal at high-level, a horizontal synchronization signal is determined according to the clock signal and the data signal.

Please refer to FIG. 6. If the data signal IBDATA transmitted by the second wire L2 is changed from high-level to low-level in the time T1 to T2 and corresponds to the clock signal IBCLK at high-level transmitted by the first wire L1, it represents that the horizontal synchronization signal HS can be determined according to the corresponding relationship between the clock signal IBCLK and the data signal IBDATA. In practical applications, the horizontal synchronization signal HS can also be a reset signal of the inter-chip bus ICB, but not limited to this.

Please refer to FIG. 7. If the time (e.g., T1) that the data signal IBDATA transmitted by the second wire L2 is changed from low-level to high-level is earlier than the time (e.g., T2) that the clock signal IBCLK transmitted by the first wire L1 is changed from low-level to high-level and the time (e.g., T4) that the data signal IBDATA transmitted by the second wire L2 is changed from high-level to low-level is later than the time (e.g., T3) that the clock signal IBCLK transmitted by the first wire L1 is changed from high-level to low-level, it represents that the valid data transaction or the control command can be determined according to the corresponding relationship between the clock signal IBCLK and the data signal IBDATA.

Please refer to FIG. 8 to FIG. 11. FIG. 8 illustrates a timing diagram showing the master timing controller embedded driver proposes a request for writing to all slave timing controller embedded drivers. FIG. 9 illustrates a timing diagram showing the master timing controller embedded driver proposes a request for writing to a specific slave timing controller embedded driver. FIG. 10 illustrates a timing diagram showing the master timing controller embedded driver proposes a request for reading to a specific slave timing controller embedded driver. FIG. 11 illustrates a timing diagram showing the specific slave timing controller embedded driver returns a reply data in response to the request for writing or reading of the master timing controller embedded driver.

As shown in FIG. 8 to FIG. 11, the clock signal IBCLK transmitted by the first wire L1 is maintained at constant period, and the data signal IBDATA transmitted by the second wire L2 can be changed according to different operating states to indicate different operating states respectively.

At first, the first two periods of the data signal IBDATA are used to indicate that the master timing controller embedded driver is in the startup state MSC or the slave timing controller embedded driver is in the startup state SSC.

For example, in FIG. 8 to FIG. 10, the first two periods of the data signal IBDATA are sequentially high-level and low-level, which means that the master timing controller embedded driver is in the startup state MSC, but not limited to this; in FIG. 11, the first two periods of the data signal IBDATA are sequentially low-level and high-level, which means that the slave timing controller embedded driver is in the startup state SSC, but not limited to this.

It should be noted that the first two periods of the data signal IBDATA can indicate that the master timing controller embedded driver is in the startup state MSC or the slave timing controller embedded driver is in the startup state SSC respectively by any two different high-level and low-level types, but not limited to this.

When the master timing controller embedded driver is in the startup state MSC, it needs to be further determined whether the master timing controller embedded driver MTED should broadcast.

For example, in FIG. 8, the third period of the data signal IBDATA is at high-level, that is to say, the control command is a broadcast enable signal, which represents that the master timing controller embedded driver MTED is in the broadcast enable state BCE, but not limited to this; in FIG. 9 to FIG. 10, the third period of the data signal IBDATA is at low-level, that is to say, the control command is a broadcast disable signal, which represents that the master timing controller embedded driver MTED is in the broadcast disabled state BCD, but not limited to this.

In practical applications, the third period of the data signal IBDATA at high-level can be also defined as the master timing controller embedded driver MTED is in the broadcast disabled state BCD and the third period of the data signal IBDATA at low-level can be also defined as the master timing controller embedded driver MTED is in the broadcast enable state BCE, depending on the actual needs.

As shown in FIG. 8, the master timing controller embedded driver MTED is in the broadcast enable state BCE, and the fourth period and the fifth period of the data signal IBDATA are both at high-level, which represents all slave timing controller embedded drivers ALL; the sixth period of the data signal IBDATA is at high-level, which represents the request for writing W. Therefore, the master timing controller embedded driver MTED in the broadcast enable state BCE can make the request for writing W to all slave timing controller embedded drivers STED1~STED3. After the request for writing W, the data signal IBDATA also includes a data address DA and a write data WD.

As shown in FIG. 9, the master timing controller embedded driver MTED is in the broadcast disabled state BCD, and the fourth period and the fifth period of the data signal IBDATA represent the address of the specific slave timing controller embedded driver, for example:

(1) When the fourth period and the fifth period are both at low-level and the sixth period is at high-level, it means that the master timing controller embedded driver MTED proposes a request for writing W to the specific slave timing controller embedded driver STED1;

(2) When the fourth period is at low-level and the fifth period and the sixth period are at high-level, it means that the master timing controller embedded driver MTED proposes a request for writing W to the specific slave timing controller embedded driver STED2;

(3) When the fourth period and the sixth period are at high-level and the fifth period is at low-level, it means that the master timing controller embedded driver MTED proposes a request for writing W to the specific slave timing controller embedded driver STED3;

Thereby, the master timing controller embedded driver MTED in the broadcast disable state BCD can make the request for writing to the specific slave timing controller embedded driver STED1, STED2 or STED3. After the request for writing W, the data signal IBDATA also includes the data address DA and the write data WD.

As shown in FIG. 10, the master timing controller embedded driver MTED is in the broadcast disabled state BCD, and the fourth period and the fifth period of the data signal IBDATA are both at high-level, it represents the specific slave timing controller embedded driver SDA; the sixth period of the data signal IBDATA is at low-level, it represents that the request for reading R is made. Therefore, the master timing controller embedded driver MTED in the broadcast disable state BCD can make the request for reading R to the specific slave timing controller embedded driver SDA. After the request for reading R, the data signal IBDATA also includes the data address DA.

In practical applications, the sixth period of the data signal IBDATA at low-level can be also defined as the request for writing W and the sixth period of the data signal IBDATA at high-level can be also defined as the request for reading, depending on the actual needs.

As shown in FIG. 11, the slave timing controller embedded driver is in the startup state SSC, and the fourth period and the fifth period of the data signal IBDATA are both at high-level, it represents the specific slave timing controller embedded driver SDA. At this time, the specific slave timing controller embedded driver SDA can return a reply data RD in response to the request for writing or reading made by the master timing controller embedded driver MTED.

Compared to the prior art, in the display apparatus of the invention, the inter-chip interface between the master timing controller embedded driver and the slave timing controller embedded drivers only needs an inter-chip bus including two wires to achieve the display synchronization between the master timing controller embedded driver and the slave timing controller embedded drivers. Since the circuit structure of the inter-chip interface becomes simpler, not only the occupied wafer area can be greatly reduced, but also the production cost can be effectively reduced to enhance its market competitiveness.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A display apparatus, comprising:

a display panel having (N+1) display areas, wherein N is a positive integer;

a master timing controller embedded driver, disposed corresponding to a first display area of the (N+1) display areas;

N slave timing controller embedded drivers, disposed corresponding to a second display area to a (N+1)-th display area of the (N+1) display areas respectively and controlled by the master timing controller embedded driver; and an inter-chip bus, comprising:

a first wire, coupled between the master timing controller embedded driver and the N slave timing controller embedded drivers, for bi-directionally transmitting a clock signal; and a second wire, coupled between the master timing controller embedded driver and the N slave timing controller embedded drivers, for bi-directionally transmitting a data signal;

wherein when the data signal is changed from low-level to high-level and corresponds to the clock signal at high-level, a vertical synchronization signal is determined according to the clock signal and the data signal.

2. The display apparatus of claim 1, further comprising:

a gate driver, coupled to a specific slave timing controller embedded driver of the N slave timing controller embedded drivers and controlled by the specific slave timing controller embedded driver.

3. The display apparatus of claim 2, wherein among the N slave timing controller embedded drivers, the specific slave timing controller embedded driver is closest to the gate driver.

4. The display apparatus of claim 1, wherein the vertical synchronization signal is also a reset signal of the inter-chip bus.

5. The display apparatus of claim 1, wherein when the data signal is changed from high-level to low-level and corresponds to the clock signal at high-level, a horizontal synchronization signal is determined according to the clock signal and the data signal.

6. The display apparatus of claim 5, wherein the horizontal synchronization signal is also a reset signal of the inter-chip bus.

7. The display apparatus of claim 1, wherein when a time that the data signal is changed from low-level to high-level is earlier than a time that the clock signal is changed from low-level to high-level and a time that the data signal is changed from high-level to low-level is later than a time that the clock signal is changed from high-level to low-level, a valid data transaction or a control command is determined according to the clock signal and the data signal.

8. The display apparatus of claim 7, wherein when the control command is a broadcast enable signal, the master timing controller embedded driver in a startup state can propose a request of writing to the N slave timing controller embedded drivers.

9. The display apparatus of claim 7, wherein when the control command is a broadcast disable signal, the master timing controller embedded driver in a startup state can propose a request of writing or reading to a specific slave timing controller embedded driver of the N slave timing controller embedded drivers.

10. The display apparatus of claim 9, wherein when the specific slave timing controller embedded driver is in the startup state in response to the request for writing or reading of the master timing controller embedded driver, the specific slave timing controller embedded driver returns a reply data.

11. The display apparatus of claim 1, further comprising:

a circuit board, wherein the first wire and the second wire are disposed on the circuit board and coupled to the master timing controller embedded driver and the N slave timing controller embedded drivers respectively.

12. An inter-chip bus, applied to a display apparatus comprising a display panel, a master timing controller embedded driver and N slave timing controller embedded drivers, the display panel having (N+1) display areas, N being a positive integer, the master timing controller embedded driver being disposed corresponding to a first display area of the (N+1) display areas, the N slave timing controller embedded drivers being disposed corresponding to a second display area to a (N+1)-th display area of the (N+1) display areas respectively and controlled by the master timing controller embedded driver, the inter-chip bus comprising:

a first wire, coupled between the master timing controller embedded driver and the N slave timing controller embedded drivers, for bi-directionally transmitting a clock signal; and a second wire, coupled between the master timing controller embedded driver and the N slave timing controller embedded drivers, for bi-directionally transmitting a data signal;

wherein when the data signal is changed from low-level to high-level and corresponds to the clock signal at high-level, a vertical synchronization signal is determined according to the clock signal and the data signal.

13. The inter-chip bus of claim 12, wherein the display apparatus further comprises a gate driver, the gate driver is coupled to a specific slave timing controller embedded driver of the N slave timing controller embedded drivers and controlled by the specific slave timing controller embedded driver.

14. The inter-chip bus of claim 13, wherein among the N slave timing controller embedded drivers, the specific slave timing controller embedded driver is closest to the gate driver.

15. The inter-chip bus of claim 12, wherein the vertical synchronization signal is also a reset signal of the inter-chip bus.

16. The inter-chip bus of claim 12, wherein when the data signal is changed from high-level to low-level and corresponds to the clock signal at high-level, a horizontal synchronization signal is determined according to the clock signal and the data signal.

17. The inter-chip bus of claim 16, wherein the horizontal synchronization signal is also a reset signal of the inter-chip bus.

18. The inter-chip bus of claim 12, wherein when a time that the data signal is changed from low-level to high-level is earlier than a time that the clock signal is changed from low-level to high-level and a time that the data signal is changed from high-level to low-level is later than a time that the clock signal is changed from high-level to low-level, a valid data transaction or a control command is determined according to the clock signal and the data signal.

19. The inter-chip bus of claim 18, wherein when the control command is a broadcast enable signal, the master timing controller embedded driver in a startup state can propose a request of writing to the N slave timing controller embedded drivers.

20. The inter-chip bus of claim 18, wherein when the control command is a broadcast disable signal, the master timing controller embedded driver in a startup state can propose a request of writing or reading to a specific slave timing controller embedded driver of the N slave timing controller embedded drivers.

21. The inter-chip bus of claim 20, wherein when the specific slave timing controller embedded driver is in the startup state in response to the request for writing or reading of the master timing controller embedded driver, the specific slave timing controller embedded driver returns a reply data.

22. The inter-chip bus of claim 12, wherein the display apparatus further comprises a circuit board, the first wire and the second wire are disposed on the circuit board and coupled to the master timing controller embedded driver and the N slave timing controller embedded drivers respectively.

* * * * *